United States Patent [19]

Itoh et al.

[11] Patent Number: 5,751,483
[45] Date of Patent: May 12, 1998

[54] COLOR FILTER HAVING POLARIZABILITY

[75] Inventors: Hisato Itoh; Tsutami Misawa; Akira Ogiso, all of Kanagawa-ken; Rihoko Imai, Tokyo, all of Japan

[73] Assignee: Mitsui Toatsu Chemicals, Inc., Tokyo, Japan

[21] Appl. No.: 510,007

[22] Filed: Aug. 1, 1995

Related U.S. Application Data

[63] Continuation of Ser. No. 170,722, Dec. 21, 1993, abandoned.

[30] Foreign Application Priority Data

Dec. 25, 1992 [JP] Japan ................................ 4-346334

[51] Int. Cl.⁶ .......................... G02B 5/30; G02B 27/28; F21V 9/14
[52] U.S. Cl. .................. 359/502; 359/491; 359/490; 349/97; 252/585
[58] Field of Search ................. 359/63, 64, 490, 359/491, 492, 885; 252/299.1, 585; 349/97

[56] References Cited

U.S. PATENT DOCUMENTS

| | | | |
|---|---|---|---|
| 4,304,683 | 12/1981 | Morinaka et al. | 252/299.1 |
| 4,360,447 | 11/1982 | Morinaka et al. | 252/299.1 |
| 4,459,218 | 7/1984 | Yamada et al. | 252/299.1 |
| 4,466,704 | 8/1984 | Schuler et al. | 359/491 |
| 4,541,691 | 9/1985 | Buzak | 359/64 |
| 4,610,507 | 9/1986 | Kamamori et al. | |
| 4,611,889 | 9/1986 | Buzak . | |
| 4,749,259 | 6/1988 | Ledebuhr . | |
| 4,770,500 | 9/1988 | Kalmanash et al. | 359/64 |
| 4,824,882 | 4/1989 | Nakamura et al. | 252/585 |
| 4,859,039 | 8/1989 | Okumura et al. | 359/491 |
| 4,991,941 | 2/1991 | Kalmanash | 359/64 |
| 4,992,218 | 2/1991 | Sugio et al. | 359/492 |
| 5,059,356 | 10/1991 | Nakamura et al. | 359/490 |
| 5,286,418 | 2/1994 | Nakamura et al. | 252/585 |

FOREIGN PATENT DOCUMENTS

| | | | |
|---|---|---|---|
| 182632 | 5/1986 | European Pat. Off. . | |
| 198082 | 10/1986 | European Pat. Off. . | |
| 541128 | 5/1993 | European Pat. Off. | 359/64 |

OTHER PUBLICATIONS

Patent Abstracts of Japan, vol. 14, No. 185, Apr. 13, 1990.
Patent Abstracts of Japan, vol. 9, No. 30, Feb. 8, 1985.
Database WPI, Section Ch, Week 8715, AN 87-105939.

*Primary Examiner*—Paul M. Dzerzynski
*Assistant Examiner*—Audrey Chang
*Attorney, Agent, or Firm*—Burns, Doane, Swecker & Mathis, L.L.P.

[57] ABSTRACT

The present invention relates to a color filter having polarizability, which comprises a dye having a spectral transmissibility, a dichroic dye having a polarizability, corresponding to the former dye and a base resin. The filter can be produced by coating and fixing the former dye on a monochromatic polarizing film produced by using the dichroic dye; mixing the former dye, the dichroic dye and the base resin, melting and extruding the mixture to produce a film and monoaxially stretching the film; dyeing a transparent film with the former dye and the dichroic dye and then monoaxially stretching the dyed film; or dyeing a transparent monoaxially stretched film with the former dye and the dichroic dye.

6 Claims, 4 Drawing Sheets

COLOR FILTER HAVING POLARIZABILITY

This application is a continuation of application Ser. No. 08/170,722, filed Dec. 21, 1993, now abandoned.

BACKGROUND OF THE INVENTION

1. Field of the Invention

The present invention relates to a color filter having a polarizability, used in display apparatuses such as a liquid crystal projection television set, overhead display, color projector and the like.

2. Description of the Related Art

In a conventional liquid crystal projection TV set, two kinds of films, i.e., a color filter and a polarizing film, have been used as components of the TV set. The combined use of these two kinds of films has had problems such as reduction in transmittance due to the light scattering between the films. Further, with this conventional technique, the combination has provided poor polarizability so that a high contrast image could not be obtained.

Figure 1:
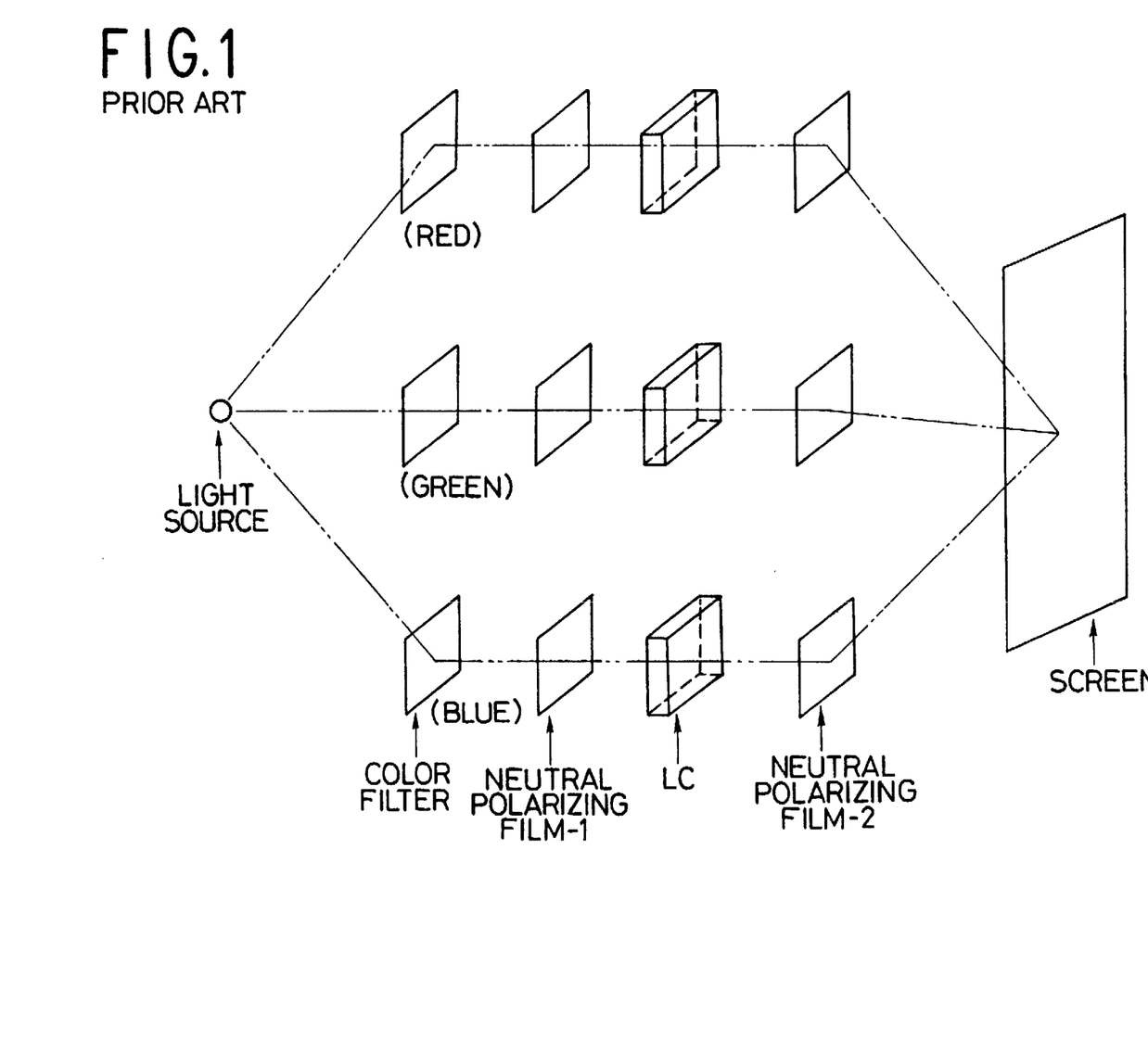
FIG. 1 is a conceptional view showing a typical combination of color filters and polarizing films used in conventional liquid crystal projectors.

The assembly of color filters and polarizing films used in a conventional liquid crystal projector is shown in FIG. 1. It comprises red, green and blue color filters, two neutral polarizing films for each color filter and a liquid crystal cell for each color filter. Each of the neutral polarizing films ordinarily used gives a single plate transmittance of from 40% to 50%, therefore, use of two such polarizing films gives a transmittance of as low as about 25% or below; therefore, a strong light source has been necessary to project a clear image.

SUMMARY OF THE INVENTION

An object of the present invention is to provide a color filter having polarizability, which is excellent in transmissibility and durability, for use as a material for use in liquid crystal projection TV sets in which a color filter and a polarizing film are separately used in a conventional technique.

The present inventors conducted extensive research under the above-mentioned situation and, as a result, found a color filter of excellent transmissibility and durability, and having polarizability.

The present invention is directed to a color filter having polarizability, which comprises a dye having a spectral transmissibility for use in a color filter, a dichroic dye having polarizability, corresponding to said dye having a spectral transmissibility, and a base resin, as well as to a process for producing the color filter.

The present invention has an effect in providing a color filter having excellent transmissibility and excellent polarizability and, when used in a display apparatus, provides a high contrast image.

DETAILED DESCRIPTION OF THE PREFERRED EMBODIMENTS

The present color filter having polarizability comprises, in combination, a dye having spectral transmissibility, for use in a color filter, and a dichroic dye corresponding thereto. Specifically, it is a single filter having polarizability which is a combination of a yellow dichroic dye having polarizability and a blue dye having spectral transmissibility, or a combination of a red dichroic dye having polarizability and a green dye having spectral transmissibility, or a combination of a blue dichroic dye having polarizability and a red dye having spectral transmissibility.

As mentioned previously, in conventional liquid crystal projectors, there are used, to project a full-colored image on a screen, red, green and blue color filters, two neutral polarizing films for each color filter and a liquid crystal cell for each color filter. The combined use of these two kinds of films, i.e., color filters and polarizing films, has had problems such as reduction in transmittance due to the light scattering between the films. Further, with this conventional technique, the combination has provided poor polarizability so that a high contrast image could not be obtained.

In contrast, the present color filter having polarizability is a single film having two functions, i.e., a color filter function and polarizability. As a result, the present color filter gives excellent light transmittance, leads to no polarizability reduction due to light scattering, and provides excellent workability in assembling a liquid crystal projection TV set because it is a single film; thus, it is an excellent material for use in a liquid crystal projection TV set.

In the present invention, the dye having spectral transmissibility, for use in a color filter, includes cyanine type dyes, phthalocyanine type dyes, anthraquinone type dyes, azo type dyes, quinophthalone type dyes, perylene type dyes and cumarin type dyes. The invention can use any known dye and has no particular restriction. Specific requirements for the dye are hat it shows, in the visible light region of 400–700 nm, the following wavelength characteristic and a dichroic ratio at the maximum absorption wavelength, of 5 or less, preferably 2 or less. That is, said dye is:

(A) a red dye for use in a color filter, giving a transmittance at 610 nm, of 50% or more when the transmittance at 590 nm is 10% or less, (B) a green dye for use in a color filter, showing a maximum transmittance a 550±20 nm and giving a maximum transmittance of 50% or more when the transmittance at (the maximum transmittance wavelength ±50 nm is 20% or less, or (C) a blue dye for use in a color filter, showing a maximum transmittance at 450±20 nm and giving a maximum transmittance of 50% or more when the transmittance at (the maximum transmittance wavelength +50 nm) is 20% or less.

The dichroic dye used in the present invention includes anthraquinone type dyes, azo type dyes, quinophthalone type dyes, perylene type dyes and cumarin type dyes. The invention can use any known dichroic dye and has no particular restriction. Specific requirements for the dichroic dye are that when a monochromatic polarizing film containing the dye is overlapped with a neutral polarizing film when the respective polarization axes are at a right angle, the dye shows, in the visible light region of 400–700 nm, the following wavelength characteristic and a dichroic ratio at the maximum absorption wavelength, of 6 or more, preferably 10 or more. That is, said dye is:

(D) a yellow dichroic dye having a main absorption wavelength band at 400–500 nm, (E) a red dichroic dye having a main absorption wavelength band at 500–600 nm, or (F) a blue dichroic dye having a main absorption wavelength band at 600–700 nm, when a monochromatic polarizing film containing the dye is overlapped with a neutral polarizing film as the respective polarization axes are at a right angle.

Figure 2:
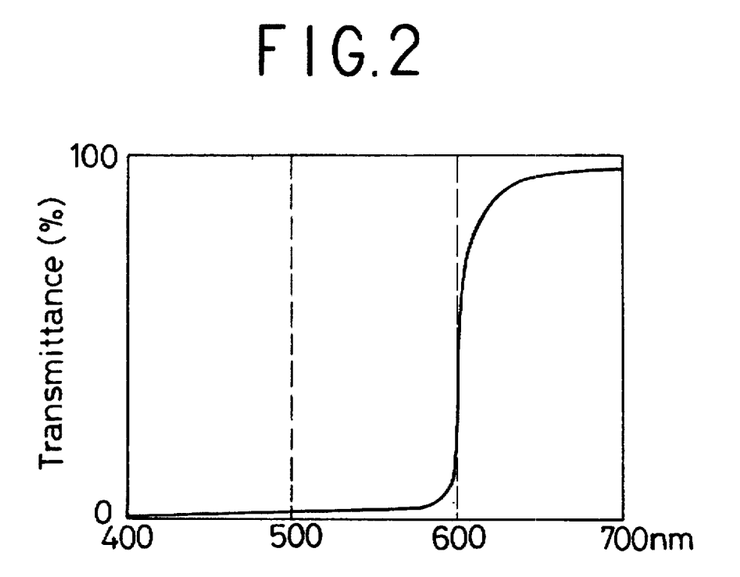
FIG. 2 is a spectral transmittance curve of a dye for use in a red color filter.
Figure 3:
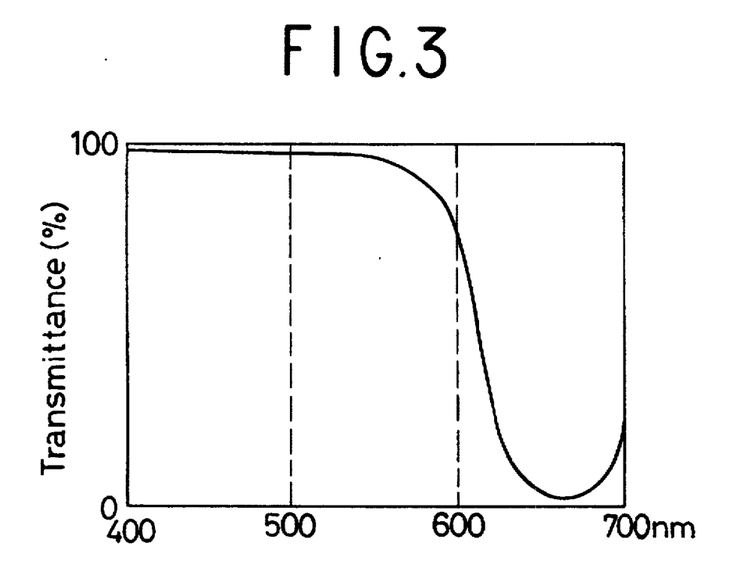
FIG. 3 is a spectral transmittance curve of a blue dichroic dye measured when a monochromatic polarizing film containing the dye is overlapped with a neutral polarizing film as the respective polarization axes are at a right angle.
Figure 4:
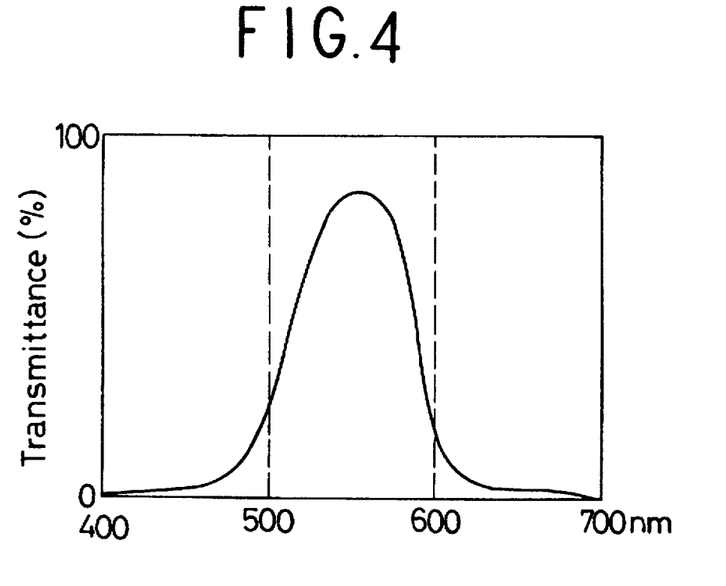
FIG. 4 is a spectral transmittance curve of a dye for use in green color filter.
Figure 5:
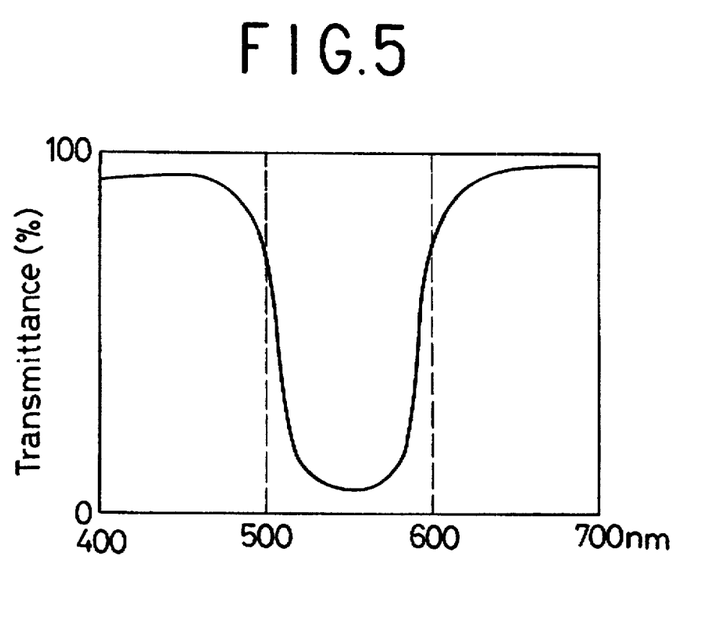
FIG. 5 is a spectral transmittance curve of a red dichroic dye measured when a monochromatic polarizing film containing the dye is overlapped with a neutral polarizing film as the respective polarization axes are at a right angle.
Figure 6:
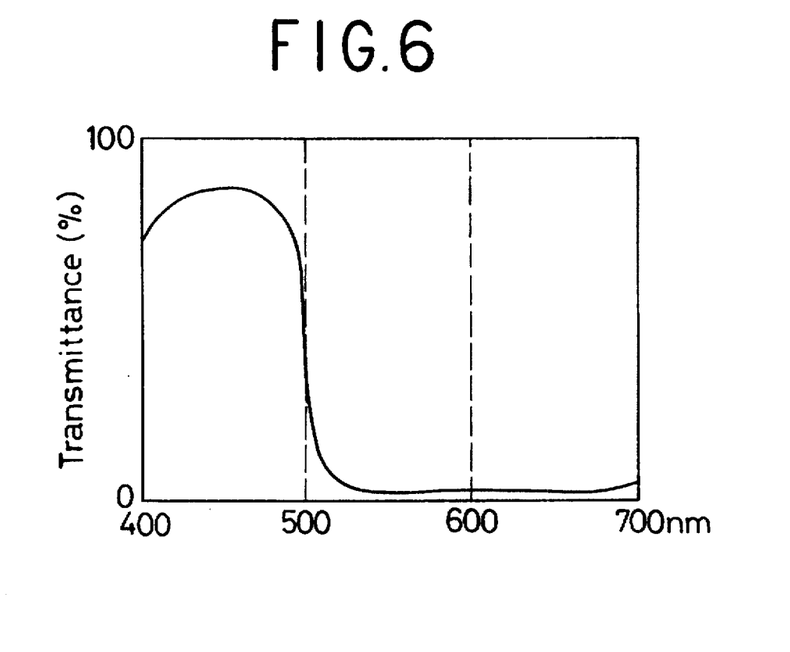
FIG. 6 is a spectral transmittance curve of a dye for use in blue color filter.
Figure 7:
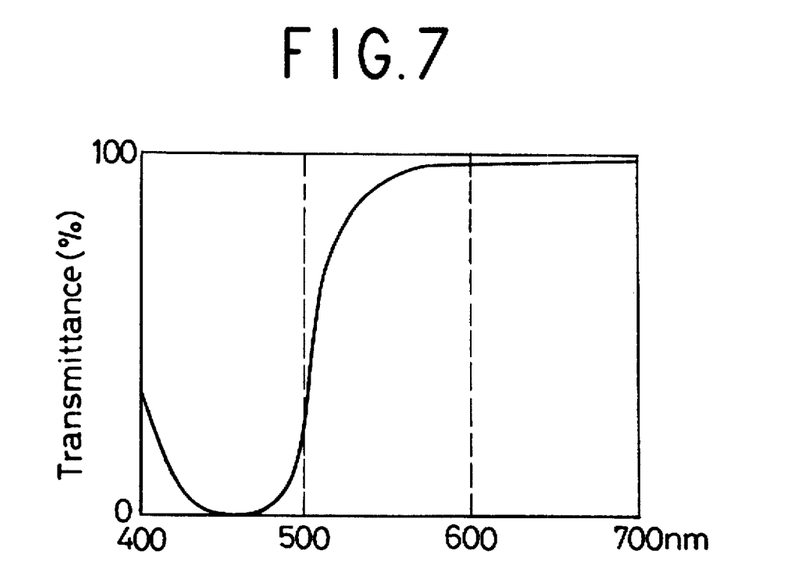
FIG. 7 is a spectral transmittance curve of a yellow dichroic dye measured when a monochromatic polarizing film containing the dye is overlapped with a neutral polarizing film as the respective polarization axes are at a right angle.

The above constitutions of the present invention are shown in FIGS. 2 to 7. The combination of a dye for a color filter and a dichroic dye corresponding thereto, which is used in the present color filter having polarizability, is:

(1) a combination of a red dye for a color filter, giving a spectral transmittance curve of FIG. 2, i.e., dye (A) and a blue dichroic dye giving a spectral transmittance curve of FIG. 3, i.e., dye (F), (2) a combination of a green dye for a color filter, giving a spectral transmittance curve of FIG. 4, i.e., dye (B) and a red dichroic dye giving a spectral transmittance curve of FIG. 5, i.e., dye (E), or (3) a combination of a blue dye for a color filter, giving a spectral transmittance curve of FIG. 6, i.e., dye (C) and a yellow dichroic dye giving a spectral transmittance curve of FIG. 7, i.e., dye (D).

The working principle of the present color filter is explained for a color filter having polarizability, employing the above combination (1), i.e., a combination of a red dye for a color filter and a blue dichroic dye. When, in FIG. 1, the red color filter and the neutral polarizing film-1 are replaced by a single color filter having polarizability, employing the combination (1) and when a light from a light source is passed through the color filter and the resulting polarized light of 600–700 nm is transmitted through the liquid crystal cell and the neutral polarizing film-2, a red image is formed on the screen; while, when the light is absorbed, no image is formed on the screen. The same principle applies also to a color filter having polarizability, employing the combination (2), i.e., a combination of a green dye for a color filter and a red dichroic dye, or a color filter having polarizability, employing the combination (3), i.e., a combination of a blue dye for a color filter and a yellow dichroic dye.

The process of the present invention for producing a color filter having polarizability, includes various processes such as the following:

(1) a process (hereinafter referred to as the first process) which comprises coating and fixing a dye having spectral transmissibility, for use in a color filter on a monochromatic polarizing film produced using a dichroic dye corresponding to said dye having spectral transmissibility (for example, coating a blue, green or red dye for a color filter on a yellow (for the blue dye), red (for the green dye) or blue (for the red dye) polarizing film), (2) a process (hereinafter referred to as the second process) which comprises mixing a blue dye for a color filter, a yellow dichroic dye and a resin, subjecting the mixture to melt extrusion to obtain a film, and subjecting the film to monoaxial stretching to produce a blue filter, mixing a green dye for a color filter, a red dichroic dye and a resin, subjecting the mixture to melt extrusion to obtain a film, and subjecting the film to monoaxial stretching to produce a green filter, or mixing a red dye for a color filter, a blue dichroic dye and a resin, subjecting the mixture to melt extrusion to obtain a film, and subjecting the film to monoaxial stretching to produce a red filter, (3) a process (hereinafter referred to as the third process) which comprises dyeing a substrate resin film with a blue dye for a color filter and a yellow dichroic dye and subjecting the dyed film to monoaxial stretching to produce a blue filter, dyeing a substrate resin film with a green dye for a color filter and a red dichroic dye and subjecting the dyed film to monoaxial stretching to produce a green filter, or dyeing a substrate resin film with a red dye for a color filter and a blue dichroic dye and subjecting the dyed film to monoaxial stretching to produce a red filter, and (4) a process (hereinafter referred to as the fourth process) which comprises dyeing a monoaxial stretched resin, in an aqueous or organic solvent-based dyeing bath, with a mixed dye solution containing a blue dye for a color filter and a yellow dichroic dye to produce a blue filter, or with a mixed dye solution containing a green dye for a color filter and a red dichroic dye to produce a green filter, or with a mixed dye solution containing a red dye for a color filter and a blue dichroic dye to produce a red filter.

In the present invention, the resin used in the color filter having a polarizability may be any resin as long as it is transparent and is easily oriented by monoaxial stretching. It includes a polyethylene terephthalate (PET), a polybutylene terephthalate (PBT), a polyethylene naphthalate (PEN), a polyvinyl alcohol (PVA) and the like.

The first process for producing the present color filter having polarizability, which comprises coating the dye for a color filter or a mixture thereof onto the monochromatic polarizing film, is conducted as follows:

First, the production of the monochromatic polarizing film is conducted by the following processes, as described in, for example, Japanese Patent Application Kokai (Laid-open) Nos. 270664/1987 (U.S. Pat. No. 5,059,356) and 275163/1987 (U.S. Pat. No. 4,824,882):

(a) a process which comprises mixing pellets of a transparent resin with a dichroic dye, subjecting the mixture to melt extrusion to produce a material film, and stretching the film monoaxially 3- to 10-fold at about the glass transition temperature (Tg) of the resin, (b) a process which comprises dyeing a transparent resin film in a dyeing bath containing a dichroic dye and then subjecting the dyed film to monoaxial stretching at about the glass transition temperature (Tg) of the resin, and (c) a process which comprises stretching a transparent resin monoaxially at the glass transition temperature (Tg) and then dyeing the stretched resin in a dyeing bath containing a dichroic dye.

The above-produced polarizing film is coated with a dye for a color filter as follows: A dye for a color filter is dissolved in a single or mixed solvent selected from aliphatic hydrocarbons such as octane, hexane, cyclohexane, dimethylcyclohexane and ethylcyclohexane, aromatic hydrocarbons such as toluene and xylene, halogen-containing solvents such as chloroform and trichloroethane, ethers such as tetrahydrofuran and dioxane, alcohols such as ethanol, methanol, ethylene glycol methyl ether (trade name: METHYL CELLOSOLVE), ethylene glycol ethyl ether (trade name: ETHYL CELLOSOLVE), ethylene glycol propyl ether (trade name: PROPYL CELLOSOLVE), ethylene glycol butyl ether (trade name: BUTYL CELLOSOLVE) and hexafluoroisopropanol, ketons such as acetone, fluoroacetone, cyclohexanone, methyl ethyl ketone and methyl butyl ketone, and esters such as ethyl acetate, butyl acetate, methyl cellosolve acetate, ethyl cellosolve acetate, propyl cellosolve acetate and butyl cellosolve acetate; the resulting solution is coated onto the polarizing film by spin-coating, dip coating or the like; and the resulting film is dryed at room temperature to 100° C. to obtain a color filter having polarizability.

The second process for producing the present color filter having polarizability, which comprises mixing a substrate resin, a dichroic dye and a dye for a color filter and then subjecting the mixture to stretching, is conducted as follows: Two dyes and a resin are mixed at a temperature higher than the melting point of the resin; the mixture is subjected to melt extrusion to prepare a material film; and the film is stretched by the method mentioned in the first process. Alternatively, two dyes and a resin are dissolved in a solvent; a cast film is prepared from the solution; and the film is stretched by the method mentioned in the first process. Thus, a color filter having polarizability is obtained.

In the third process for producing a color filter having polarizability, which comprises dyeing a transparent film with a dye for a color filter and a dichroic dye and then subjecting the dyed film to monoaxial stretching, the dyeing is conducted, for example, by the following methods:

(a) A transparent film is dyed in a solution containing 0.001–5% of a dichroic dye, at room temperature to 200° C. under normal pressure to 10 kg/cm$^2$ for 1 minute to 1 hour; and the resulting film is also dyed in a solution containing 0.001–5% of a dye for a color filter, at from room temperature to 200° C. under from normal pressure to 10 kg/cm$^2$ for 1 minute to 1 hour.

(b) A transparent film is dyed with a dye for a color filter; and the resulting film is dyed with a dichroic dye.

(c) A transparent film is dyed in 0.001–5% solution of a mixture of a dichroic dye and a dye for a color filter, in which the ratio of the two dyes is 1:0.01–100, at from room temperature to 200° C. under normal pressure to 10 kg/cm$^2$ for 1 minute to 1 hour.

Each solvent used in the above three dyeing methods is preferably water or ethylene glycol. Each dye may be dissolved completely or dispersed in each solvent. During the dyeing, there may be added as necessary 0.001–10% of a nonionic or anionic surfactant and 0.001–10% of Glauber's salt or a salt. The dyed film is monoaxially stretched from 3- to 10-fold at the glass transition temperature (Tg) of the transparent film, whereby a color filter having a polarizability is obtained.

The stretching may be a dry or wet stretching. As necessary, thermofixing due to annealing may be conducted. In the stretching of a PVA film, a boric acid treatment is applied during or after the stretching.

The fourth process for producing a color filter having polarizability, which comprises dyeing a monoaxially stretched film, is conducted as follows: A transparent film such as PVA film, PET film or the like is monoaxially stretched from 3- to 10-fold; then, the stretched film is dyed by the following methods:

(a) The stretched transparent film is dyed in a solution containing 0.001–5% of a dichroic dye, at from room temperature to 200° C. under normal pressure to 10 kg/cm$^2$ for 1 minute to 1 hour; and the resulting film is also dyed in a solution containing 0.001–5% of a dye for a color filter, at from room temperature to 200° C. under from normal pressure to 10 kg/cm$^2$ for 1 minute to 1 hour.

(b) The stretched transparent film is dyed with a dye for a color filter and the resulting dyed film is dyed with a dichroic dye.

(c) The stretched transparent film is dyed in 0.001–5% solution of a mixture of a dichroic dye and a dye for a color filter, in which the ratio of the two dyes is 1:0.01–100, at from room temperature to 200° C. under from normal pressure to 10 kg/cm$^2$ for 1 minute to 1 hour.

Each solvent used in the above three dyeing methods is preferably water or ethylene glycol. Each dye may be dissolved completely or dispersed in each solvent. During the dyeing, there may be added as necessary 0.001–10% of a nonionic or anionic surfactant and 0.001–10% of Glauber's salt or a salt. Thus, a color filter having polarizability is obtained.

In the above descriptions, although the terms "dye for a color filter", "dichroic dye" and "resin" are used in the singular, each of them means not only a single substance but also a mixture of two or more substances.

The present invention is specifically described below. However, the present invention is not restricted to these Examples.

EXAMPLE 1

A red polarizing film (PET type, a product of Mitsui Toatsu Chemicals, Inc.) was coated, by spin coating (1,500 rpm), with a solution of 1 g of a green dye for a color filter, represented by formula (1) and 2 g of a yellow dye for a color filter, represented by formula (2), dissolved in 200 g of toluene, whereby a green color filter having a polarizability was produced. Two of the thus-produced color filters were overlapped with each other so that the respective polarization axes were parallel or at a right angle to each other. The resulting two laminates were measured for absorption spectrums simultaneously. As a result, the situation in which the two color filters were overlapped so that the polarization axes were parallel, gave a high transmittance at 520–570 nm. Thus, the color filter had excellent performance as a green filter. Further, the color filter exhibited a large dichroic ratio at 520–570 nm and consequently, it had a high polarizability.

(1)

(2)

EXAMPLE 2

A blue polarizing film (PET type, a product of Nitto Electric Industrial Co., Ltd.) was coated, by spin coating (2,000 rpm), with a solution of 1 g of a red dye for a color filter, represented by formula (3) and 0.5 g of a yellow dye for a color filter, represented by formula (2), dissolved in 200 g of cyclohexanone, whereby a red color filter having a polarizability was produced. Two of the thus-produced color filters were overlapped with each other so that the respective polarization axes were parallel or at a right angle to each other. The resulting two laminates were measured for absorption spectrums simultaneously. As a result, the situation in which the two color filters were overlapped so that the polarization axes were parallel, gave a high transmittance at 620–700 nm. Thus, the color filter had excellent performance as a red filter. Further, the color filter exhibited a large dichroic ratio at 620–700 nm and consequently, it had a high polarizability.

(3)

EXAMPLE 3

A PVA film was dyed for 5 minutes in a dyeing bath of 2 g of a 1:1 mixture of two dichroic dyes, i.e., C.I. Direct Yellow 12 and C.I. Direct Orange 39 (produced by Nippon Kayaku Co., Ltd., trade name: KAYARUS SUPRA ORANGE 2GL) dissolved in 1 liter of water. The dyed film was stretched 4-fold and dipped in a 5% aqueous boric acid solution for 3 minutes. The resulting film was air-dried at room temperature. Onto both sides of the dyed, stretched and dried PVA film were overlapped triacetylcellulose (TAC) films as a protective film.

The thus-produced yellow polarizing film was coated, by spin coating (1,800 rpm), with a solution of 1 g of a blue dye for a color filter, represented by formula (4) and 0.5 g of a blue dye for a color filter, represented by formula (5), dissolved in 200 g of toluene, whereby a blue color filter having polarizability was produced. Two of the thus-produced color filters were overlapped with each other so that the respective polarization axes were parallel or at a right angle to each other. The resulting two laminates were measured for absorption spectrums simultaneously. As a result, the situation in which the two color filters were overlapped so that the polarization axes were parallel, gave a high transmittance at 420–480 nm. Thus, the color filter had excellent performance as a blue filter. Further, the color filter exhibited a large dichroic ratio at 420–480 nm and consequently, it had a high polarizability.

(4)

(5)

EXAMPLE 4

To 1 kg of pellets of a polyethylene terephthalate resin were added 1 g of a green dye for a color filter, represented by formula (1), 2 g of a yellow dye for a color filter, represented by formula (2) and 2 g of a dichroic red dye represented by formula (6). They were uniformly mixed and melt-extruded to prepare a film. The film was stretched 5-fold in a crosswise direction at 80° C. using a tenter stretching machine, and then heat-treated at 150° C. for 1 minute, whereby a green color filter having a polarizability was produced. Two of the thus-produced color filters were overlapped with each other so that the respective polarization axes were parallel or at a right angle to each other. The resulting two laminates were measured for absorption spectrums simultaneously. As a result, the situation in which the two color filters were overlapped so that the polarization axes were parallel, gave a high transmittance at 520-570 nm. Thus, the color filter had excellent performance as a green filter. Further, the color filter exhibited a large dichroic ratio at 520-570 nm and consequently, it had a high polarizability. The color filter, when allowed to stand for 500 hours under the conditions of 80° C. and 90% relative humidity, gave substantially no change in color and substantially no reduction in polarizability.

duced. Two of the thus-produced color filters were overlapped with each other so that the respective polarization axes were parallel or at a right angle to each other. The resulting two laminates were measured for absorption spectrums simultaneously. As a result, the situation in which the two color filters were overlapped so that the polarization axes were parallel, gave a high transmittance at 620-700 nm. Thus, the color filter had excellent performance as a red filter. Further, the color filter exhibited a large dichroic ratio at 620-700 nm and consequently, it had a high polarizability. The color filter, when allowed to stand for 500 hours under the conditions of 80° C. and 90% relative humidity, gave substantially no change in color and substantially no reduction in polarizability.

EXAMPLE 5

To 1 kg of pellets of a polyethylene terephthalate resin were added 1 g of a red dye for a color filter, represented by formula (3), 2 g of a yellow dye for a color filter, represented by formula (2), 1 g of a dichroic blue dye represented by formula (7) and 1 g of a dichroic blue dye represented by formula (8). They were uniformly mixed and melt-extruded to prepare a film. The film was stretched 5-fold in the crosswise direction at 80° C. using a tenter stretching machine, and then heat-treated at 150° C. for 1 minute, whereby a red color filter having polarizability was pro-

EXAMPLE 6

To 1 kg of pellets of a polyethylene terephthalate resin were added 1 g of a blue dye for a color filter, represented by formula (4), 0.5 g of a blue dye for a color filter, represented by formula (5) and 1 g of a dichroic yellow dye represented by formula (9). They were uniformly mixed and melt-extruded to prepare a film. The film was stretched 5-fold in a crosswise direction at 80° C. using a tenter stretching machine, and then heat-treated at 150° C. for 1 minute, whereby a blue color filter having a polarizability was produced. Two of the thus-produced color filters were overlapped with each other so that the respective polarization axes became parallel or at a right angle to each other. The resulting two laminates were measured for absorption spectrums simultaneously. As a result, the situation in which the two color filters were overlapped so that the polarization axes were parallel, gave a high transmittance at 420-480 nm. Thus, the color filter had excellent performance as a blue filter. Further, the color filter exhibited a large dichroic ratio at 420-480 nm and consequently, it had a high polarizability. The color filter, when allowed to stand for 500 hours under the conditions of 80° C. and 90% relative humidity, gave substantially no change in color and substantially no reduction in polarizability.

(9)

EXAMPLE 7

A PVA film was dyed for 5 minutes in a dyeing bath of 2 g of a 1:1:3 mixture of two dyes for a color filter, i.e., C.I. Reactive Blue 19 and C.I. Reactive Yellow 3 and a dichroic dye, i.e., C.I. Direct Red 81 dissolved in 1 liter of water. The dyed film was stretched 4-fold and dipped in a 5% aqueous boric acid solution for 3 minutes. The resulting film was air-dried at room temperature. Onto both sides of the dyed, stretched and dried PVA film were overlapped triacetylcellulose (TAC) films as a protective film.

Two of the thus-produced color filters were overlapped with each other so that the respective polarization axes were parallel or at a right angle to each other. The resulting two laminates were measured for absorption spectrums simultaneously. As a result, the situation in which the two color filters were overlapped so that the polarization axes were parallel, gave a high transmittance at 520–570 nm. Thus, the color filter had excellent performance as a green filter. Further, the color filter exhibited a large dichroic ratio at 520–570 nm and consequently, it had a high polarizability.

EXAMPLE 8

A PVA film was dyed for 5 minutes in a dyeing bath of 2 g of a 2:1:1:1 mixture of two dyes for a color filter, i.e., C.I. Reactive Red 6 and C.I. Reactive Yellow 17 and two dichroic dyes, i.e., C.I. Direct Blue 168 and C.I. Direct Blue 202 dissolved in 1 liter of water. The dyed film was stretched 4-fold and dipped in a 5% aqueous boric acid solution for 3 minutes. The resulting film was air-dried at room temperature. Onto both sides of the dyed, stretched and dried PVA film were overlapped triacetylcellulose (TAC) films as a protective film.

Two of the thus-produced color filters were overlapped with each other so that the respective polarization axes with parallel or at a right angle to each other. The resulting two laminates were measured for absorption spectrums simultaneously. As a result, the situation in which the two color filters were overlapped so that the polarization axes were parallel, gave a high transmittance at 620–700 nm. Thus, the color filter had excellent performance as a red filter. Further, the color filter exhibited a large dichroic ratio at 620–700 nm and consequently, it had a high polarizability.

EXAMPLE 9

A PVA film was dyed for 5 minutes in a dyeing bath of 2 g of a 1:2:1:2 mixture of two dyes for a color filter, i.e., C.I. Reactive Violet 2 and C.I. Reactive Blue 19 and two dichroic dyes, i.e., C.I. Direct Yellow 12 and C.I. Direct Orange 12 dissolved in 1 liter of water. The dyed film was stretched 4-fold and dipped in a 5% aqueous boric acid solution for 3 minutes. The resulting film was air-dried at room temperature. Onto both sides of the dyed, stretched and dried PVA film were overlapped triacetylcellulose (TAC) films as a protective film.

Two of the thus-produced color filters were overlapped with each other so that the respective polarization axes became parallel or a right angle to each other. The resulting two laminates were measured for absorption spectrums simultaneously. As a result, the situation in which the two color filters were overlapped so that the polarization axes were parallel, gave a high transmittance at 420–480 nm. Thus, the color filter had excellent performance as a blue filter. Further, the color filter exhibited a large dichroic ratio at 420–480 nm and consequently, it had a high polarizability.

EXAMPLE 10

A PVA film was stretched 4-fold and then dyed for 5 minutes in a dyeing bath of 2 g of a 1:1:3 mixture of two dyes for a color filter, i.e., C.I. Reactive Blue 19 and C.I. Reactive Yellow 3 and a dichroic dye, i.e., C.I. Direct Red 81 dissolved in 1 liter of water. The dyed film was dipped in a 5% aqueous boric acid solution for 3 minutes. The resulting film was air-dried at room temperature. Onto both sides of the stretched and dried PVA film were overlapped triacetylcellulose (TAC) films as a protective film.

Two of the thus-produced color filters were overlapped with each other so that the respective polarization axes with parallel or at a right angle to each other. The resulting two laminates were measured for absorption spectrums simultaneously. As a result, the situation in which the two color filters were overlapped so that the polarization axes were parallel, gave a high transmittance at 520–570 nm. Thus, the color filter had excellent performance as a blue filter. Further, the color filter exhibited a large dichroic ratio at 520–570 nm and consequently, it had a high polarizability.

EXAMPLE 11

A PVA film was stretched 4-fold and then dyed for 5 minutes in a dyeing bath of 2 g of a 2:1:1:1 mixture of two dyes for a color filter, i.e., C.I. Reactive Red 6 and C.I. Reactive Yellow 17 and two dichroic dyes, i.e., C.I. Direct Blue 168 and C.I. Direct Blue 202 dissolved in 1 liter of water. The dyed film was dipped in a 5% aqueous boric acid solution for 3 minutes. The resulting film was air-dried at room temperature. Onto both sides of the stretched and dried PVA film were overlapped triacetylcellulose (TAC) films as a protective film.

Two of the thus-produced color filters were overlapped with each other so that the respective polarization axes became parallel or a right angle to each other. The resulting two laminates were measured for absorption spectrums simultaneously. As a result, the situation in which the two color filters were overlapped so that the polarization axes were parallel, gave a high transmittance at 620–700 nm. Thus, the color filter had excellent performance as a red filter. Further, the color filter exhibited a large dichroic ratio at 620–700 nm and consequently, it had a high polarizability.

EXAMPLE 12

A PVA film was stretched 4-fold and then dyed for 5 minutes in a dyeing bath of 2 g of a 1:2:1:2 mixture of two dyes for a color filter, i.e., C.I. Reactive Violet 2 and C.I.

Reactive Blue 19 and two dichroic dyes. i.e., C.I. Direct Yellow 12 and C.I. Direct Orange 12 dissolved in 1 liter of water. The dyed film was dipped in a 5% aqueous boric acid solution for 3 minutes. The resulting film was air-dried at room temperature. Onto both sides of the stretched and dried PVA film were overlapped triacetylcellulose (TAC) films as a protective film.

Two of the thus-produced color filters were overlapped with each other so that the respective polarization axes were parallel or at a right angle to each other. The resulting two laminates were measured for absorption spectrums simultaneously. As a result, the situation in which the two color filters were overlapped so that the polarization axes were parallel, gave a high transmittance at 420–480 nm. Thus, the color filter had excellent performance as a blue filter. Further, the color filter exhibited a large dichroic ratio at 420–480 nm and consequently, it had a high polarizability.

What is claimed is:

1. A color filter having polarizability, which comprises
   (a) a non-dichroic dye having a dichroic ratio less than 5 and spectral transmissibility at a wavelength range, for use in a color filter,
   (b) a dichroic dye having a dichroic ratio more than 6 and an absorption band at the transmissible wavelength range of the non-dichroic dye, and
   (c) a base resin, wherein the non-dichroic dye and the dichroic dye are selected from the group consisting of (1) a red non-dichroic dye and a blue dichroic dye, (2) a green non-dichroic dye and a red dichroic dye, and (3) a blue non-dichroic dye and a yellow dichroic dye.

2. The color filter having polarizability according to claim 1, wherein at least one of the non-dichroic dye and the dichroic dye is contained in the base resin.

3. A process for producing a color filter having polarizability, which comprises coating and fixing a non-dichroic dye having a dichroic ratio less than 5 and spectral transmissibility at a wavelength range, for use in a color filter, on a monochromatic polarizing film produced from a dichroic dye having a dichroic ratio more than 6 and an absorption band at the transmissible range of the non-dichroic dye, wherein the non-dichroic dye and the dichroic dye are selected from the group consisting of (1) a red non-dichroic dye and a blue dichroic dye, (2) a green non-dichroic dye and a red dichroic dye, and (3) a blue non-dichroic dye and a yellow dichroic dye.

4. A process for producing a color filter having polarizability, which comprises mixing a non-dichroic dye having a dichroic ratio less than 5 and spectral transmissibility at a wavelength range, for use in color filter, a dichroic dye having a dichroic ratio more than 6 and an absorption band at the transmissible range of the non-dichroic dye and a transparent resin, subjecting the mixture to melt extrusion to obtain a film, and subjecting the film to monoaxial stretching, wherein the non-dichroic dye and the dichroic dye are selected from the group consisting of (1) a red non-dichroic dye and a blue dichroic dye, (2) a green non-dichroic dye and a red dichroic dye, and (3) a blue non-dichroic dye and a yellow dichroic dye.

5. A process for producing a color filter having polarizability, which comprises dyeing a transparent film with a non-dichroic dye having a dichroic ratio less than 5 and spectral transmissibility at a wavelength range, for use in a color filter, and a dichroic dye having a dichroic ratio more than 6 and an absorption band at the transmissible range of the non-dichroic dye, and subjecting the dyed film to monoaxial stretching, wherein the non-dichroic dye and the dichroic dye are selected from the group consisting of (1) a red non-dichroic dye and a blue dichroic dye, (2) a green non-dichroic dye and a red dichroic dye, and (3) a blue non-dichroic dye and a yellow dichroic dye.

6. A process for producing a color filter having polarizability, which comprises dyeing a transparent monoaxially stretched film with a non-dichroic dye having a dichroic ratio less than 5 and spectral transmissibility at a wavelength range, for use in a color filter, and a dichroic dye having a dichroic ratio more than 6 and an absorption band at the transmissible range of a non-dichroic dye, wherein the non-dichroic dye and the dichroic dye are selected from the group consisting of (1) a red non-dichroic dye and a blue dichroic dye, (2) a green non-dichroic dye and a red dichroic dye, and (3) a blue non-dichroic dye and a yellow dichroic dye.

* * * * *